United States Patent
Farber et al.

(10) Patent No.: US 7,158,169 B1
(45) Date of Patent: Jan. 2, 2007

(54) METHOD AND SYSTEM FOR DISPLAYING CONTENT WHILE REDUCING BURN-IN OF A DISPLAY

(75) Inventors: Stuart H. Farber, Horsham, PA (US); Daniel L. McGonigal, Line Lexington, PA (US); Jeremy C. Rosenberg, Havre de Grace, MD (US); Robert M. Steinberg, Horsham, PA (US); Ronald M. Yurman, West Orange, NJ (US)

(73) Assignee: Music Choice, Horsham, PA (US)

( * ) Notice: Subject to any disclaimer, the term of this patent is extended or adjusted under 35 U.S.C. 154(b) by 543 days.

(21) Appl. No.: 10/383,422

(22) Filed: Mar. 7, 2003

(51) Int. Cl.
*H04N 3/20* (2006.01)
*G06F 17/00* (2006.01)

(52) U.S. Cl. .................. 348/173; 348/564; 715/867

(58) Field of Classification Search ............... 348/173, 348/377, 380, 553, 563–569, 584, 588, 14.08, 348/14.07, 14.09, 14.12, 705; 715/867, 526, 715/517, 520; 386/55
See application file for complete search history.

(56) References Cited

U.S. PATENT DOCUMENTS

| | | | |
|---|---|---|---|
| 4,127,796 A | 11/1978 | Henderson | 315/395 |
| RE29,997 E | 5/1979 | den Toonder | |
| 4,336,478 A | 6/1982 | Quilty et al. | 313/478 |
| 4,338,623 A | 7/1982 | Asmus et al. | 358/22 |
| 4,360,805 A | 11/1982 | Andrews et al. | 340/744 |
| 4,677,430 A | 6/1987 | Falkman et al. | 340/723 |
| 4,722,005 A | 1/1988 | Ledenbach | 358/168 |
| 4,760,455 A | 7/1988 | Nagashima | 358/242 |
| 4,799,156 A | 1/1989 | Shavit et al. | |
| 5,130,615 A | 7/1992 | George | 315/381 |
| 5,193,006 A | 3/1993 | Yamazaki | 358/242 |
| 5,341,350 A | 8/1994 | Frank et al. | |
| 5,355,302 A | 10/1994 | Martin et al. | |
| 5,365,381 A | 11/1994 | Scheffler | |
| 5,371,551 A | 12/1994 | Logan et al. | |
| 5,418,654 A | 5/1995 | Scheffler | |
| 5,481,296 A | 1/1996 | Cragun et al. | |
| 5,534,911 A | 7/1996 | Levitan | |
| 5,550,863 A | 8/1996 | Yurt et al. | |
| 5,557,541 A | 9/1996 | Schulhof et al. | |
| 5,572,442 A | 11/1996 | Schulhof et al. | |
| 5,585,866 A | 12/1996 | Miller et al. | |

(Continued)

FOREIGN PATENT DOCUMENTS

EP 1 022 900 A1 7/2000

(Continued)

OTHER PUBLICATIONS

6 Pages from the web site for www.request.com.

(Continued)

*Primary Examiner*—Victor R. Kostak
(74) *Attorney, Agent, or Firm*—Rothwell, Figg, Ernst & Manbeck

(57) ABSTRACT

A method and system for reducing burn-in of a display is disclosed. A plurality of assets containing text, graphics, and video are stored and then gathered. These assets are then assembled into a template to form a video frame or "screen", which is subsequently output in a video transport stream or video display. Based upon a trigger, the assets are gathered again and reassembled in a second template to form a second video frame or screen wherein the assets are in positions on the screen, which are different from those of the first screen. The second screen is subsequently output to the video transport stream and the process is repeated.

26 Claims, 5 Drawing Sheets

U.S. PATENT DOCUMENTS

| | | | |
|---|---|---|---|
| 5,590,282 A | 12/1996 | Clynes | |
| 5,592,511 A | 1/1997 | Schoen et al. | |
| 5,616,876 A | 4/1997 | Cluts | |
| 5,617,565 A | 4/1997 | Augenbraun et al. | |
| 5,629,867 A | 5/1997 | Goldman | |
| 5,635,989 A | 6/1997 | Rothmuller | |
| 5,636,276 A | 6/1997 | Brugger | |
| 5,657,096 A * | 8/1997 | Lukacs | 348/585 |
| 5,675,734 A | 10/1997 | Hair | |
| 5,708,780 A | 1/1998 | Levergood et al. | |
| 5,721,815 A | 2/1998 | Ottesen et al. | |
| 5,726,909 A | 3/1998 | Krikorian | |
| 5,734,719 A | 3/1998 | Tsevdos et al. | |
| 5,734,961 A | 3/1998 | Castille | |
| 5,751,282 A | 5/1998 | Girard et al. | |
| 5,754,939 A | 5/1998 | Herz et al. | |
| 5,761,606 A | 6/1998 | Wolzien | |
| 5,761,607 A | 6/1998 | Gudesen | |
| 5,761,662 A | 6/1998 | Dasan | |
| 5,781,889 A | 7/1998 | Martin et al. | |
| 5,784,595 A | 7/1998 | Devins et al. | |
| 5,790,935 A | 8/1998 | Payton | |
| 5,793,980 A | 8/1998 | Glaser et al. | |
| 5,809,144 A | 9/1998 | Sirbu et al. | |
| 5,809,246 A | 9/1998 | Goldman | |
| 5,819,049 A | 10/1998 | Rietmann | |
| 5,819,160 A | 10/1998 | Foladare et al. | |
| 5,832,120 A * | 11/1998 | Prabhakar et al. | 382/233 |
| 5,835,487 A | 11/1998 | Campanella | |
| 5,841,979 A | 11/1998 | Schulhof et al. | |
| 5,848,398 A | 12/1998 | Martin et al. | |
| 5,861,906 A | 1/1999 | Dunn et al. | |
| 5,878,141 A | 3/1999 | Daly et al. | |
| 5,890,137 A | 3/1999 | Koreeda | |
| 5,890,139 A | 3/1999 | Suzuki et al. | |
| 5,899,699 A | 5/1999 | Kamiya | |
| 5,899,980 A | 5/1999 | Wilf et al. | |
| 5,900,830 A | 5/1999 | Scheffler | |
| 5,918,213 A | 6/1999 | Bernard et al. | |
| 5,926,624 A | 7/1999 | Katz et al. | |
| 5,930,765 A | 7/1999 | Martin | |
| 5,930,768 A | 7/1999 | Hooban | |
| 5,931,901 A | 8/1999 | Wolfe et al. | |
| 5,933,500 A | 8/1999 | Blatter et al. | |
| 5,943,422 A | 8/1999 | Van Wie et al. | |
| 5,944,608 A | 8/1999 | Reed et al. | |
| 5,959,945 A | 9/1999 | Kleiman | |
| 5,960,411 A | 9/1999 | Hartman et al. | |
| 5,961,662 A | 10/1999 | Yamaguchi et al. | |
| 5,968,120 A | 10/1999 | Guedalia | |
| 5,969,283 A | 10/1999 | Looney et al. | |
| 5,970,474 A | 10/1999 | LeRoy et al. | |
| 5,973,722 A | 10/1999 | Wakai et al. | |
| 5,980,261 A | 11/1999 | Mino et al. | |
| 5,986,692 A | 11/1999 | Logan et al. | |
| 5,991,374 A | 11/1999 | Hazenfield | |
| 5,991,737 A | 11/1999 | Chen | |
| 6,011,761 A | 1/2000 | Inoue | |
| 6,011,854 A | 1/2000 | Van Ryzin | |
| 6,021,432 A | 2/2000 | Sizer, II et al. | |
| 6,025,868 A | 2/2000 | Russo | |
| 6,038,591 A | 3/2000 | Wolfe et al. | |
| 6,055,314 A | 4/2000 | Spies et al. | |
| 6,055,566 A | 4/2000 | Kikinis | |
| 6,085,235 A | 7/2000 | Clarke, Jr. et al. | |
| 6,088,455 A | 7/2000 | Logan et al. | |
| 6,088,722 A | 7/2000 | Herz et al. | |
| 6,105,060 A | 8/2000 | Rothblatt | |
| 6,108,028 A * | 8/2000 | Skarbo et al. | 348/14.03 |
| 6,135,646 A | 10/2000 | Kahn et al. | |
| 6,151,634 A | 11/2000 | Glaser et al. | |
| 6,154,772 A | 11/2000 | Dunn et al. | |
| 6,161,142 A | 12/2000 | Wolfe et al. | |
| 6,192,340 B1 | 2/2001 | Abecassis | |
| 6,223,292 B1 | 4/2001 | Dean et al. | |
| 6,226,030 B1 | 5/2001 | Harvey et al. | |
| 6,226,618 B1 | 5/2001 | Downs et al. | |
| 6,229,895 B1 | 5/2001 | Son et al. | |
| 6,232,539 B1 | 5/2001 | Looney et al. | |
| 6,233,682 B1 | 5/2001 | Fritsch | |
| 6,240,553 B1 | 5/2001 | Son et al. | |
| 6,243,725 B1 | 6/2001 | Hempleman et al. | |
| 6,246,672 B1 | 6/2001 | Lumelsky | |
| 6,249,810 B1 | 6/2001 | Kiraly | |
| 6,253,235 B1 | 6/2001 | Estes | |
| 6,253,237 B1 | 6/2001 | Story et al. | |
| 6,256,008 B1 * | 7/2001 | Sparks et al. | 345/618 |
| 6,262,772 B1 | 7/2001 | Shen et al. | 348/445 |
| 6,279,040 B1 | 8/2001 | Ma et al. | |
| 6,286,139 B1 | 9/2001 | Decinque | |
| 6,305,020 B1 | 10/2001 | Hoarty et al. | |
| 6,324,217 B1 | 11/2001 | Gordon | |
| 6,330,595 B1 | 12/2001 | Ullman et al. | |
| 6,330,609 B1 | 12/2001 | Garofalakis et al. | |
| 6,369,851 B1 | 4/2002 | Marflak et al. | 348/173 |
| 6,448,956 B1 * | 9/2002 | Berman et al. | 345/156 |
| 6,636,220 B1 * | 10/2003 | Szeliski et al. | 345/475 |
| 6,924,845 B1 * | 8/2005 | Wahlroos | 348/553 |
| 2001/0035874 A1 | 11/2001 | Hamilton et al. | 345/682 |
| 2001/0042107 A1 | 11/2001 | Palm | |
| 2002/0023164 A1 | 2/2002 | Lahr | |
| 2002/0023166 A1 | 2/2002 | Bar-Noy et al. | |
| 2002/0032728 A1 | 3/2002 | Sako et al. | |
| 2002/0038359 A1 | 3/2002 | Ihara et al. | |
| 2002/0056117 A1 | 5/2002 | Hasegawa et al. | |
| 2002/0056118 A1 | 5/2002 | Hunter et al. | |
| 2002/0059621 A1 | 5/2002 | Thomas et al. | |
| 2002/0062261 A1 | 5/2002 | Mukai | |
| 2003/0142212 A1 * | 7/2003 | Grimes et al. | 348/173 |
| 2004/0041849 A1 * | 3/2004 | Mock et al. | 345/867 |
| 2005/0160377 A1 * | 7/2005 | Sciammarella et al. | 715/838 |

FOREIGN PATENT DOCUMENTS

| | | |
|---|---|---|
| WO | WO 97/37492 A1 | 10/1997 |
| WO | WO 99/17230 A1 | 4/1999 |
| WO | WO 99/48296 A1 | 9/1999 |
| WO | WO 00/07368 A1 | 2/2000 |
| WO | WO 01/36064 A1 | 5/2001 |

OTHER PUBLICATIONS

Clark D., ClickRadio to Start Digital Music Services, WSJ Interactive Edition, 2000.

"ClickRadio granted first interactive radio license by universal music group; . . . ," www.clickradio.com, printed Apr. 20, 2000.

Gordon, C., "ClickRadio sidesteps competition with music licensing deals," Atnewyork.com, May 12, 2000.

"Phillips Showcases Clickradio on digital set-top at western show 2000; . . . ," Business Wire, Inc., Nov. 29, 2000.

Web site for www.sonicnet.com., printed Jun. 22, 2004, 6 pages.

ntl: Digital Radio. http://www.ntl.com/locales/gb/en/guides/dummies/produce.asp.

Bower (1998). "Digital Radio—A Revolution for In-Car Entertainment" Proc. NavPos Automative '98 Conf. 2(5-8): 40-51.

Deutsche Telekom AG: Digital Radio. http://www.telekom.de/dtag/ip11/cda/level3_a/0,10077,00.html.

The Eureka 147 Consortium. "Digital Audio Broadcasting" http://www.eureadab.org/eureka_147_consortium.htm.

Radio Authority (1999). Digital Radio Fact Sheet No. 4. http://www.radioauthority.org.uk/Information/Fact_Sheets/fs4.htm.

ICTV (2000). Digital Broadband System Press Release: 1-11.

Launch.com.

"Sonicbox brings Net radio into your living room" (Partyka, Jeff. Oct. 12, 1999. CNN.com).

"Internet Radio Listeners Unchained From Their PCs" (Olenick, Doug. Oct. 25, 1999. Twice Computer Technology).

"Sonicbox and Microsoft Bring Windows Media Internet Radio to the home Stereo" (Dec. 7, 1999 Microsoft Press Release).

"Turn on, Tune in, Drop Cash" (King, Brad. Dec. 8, 2000. Wired News).

"Global Media Announces Launch of Independent Internet Radio station; Station includes E-Commerce Point of Purchase for Music" (Feb. 1, 1999. Business Wire).

"Platinum Entertainment and Liquid Audio Join Forces to Offer Extensive Music Catalog via Digital Downloads" (Jul. 15, 1998. PR Newswire).

"Thinking Globally with a web-based radio station vying for listeners around the world, homegrown internet company fastband aims to shake up the music world" (LaFrance, Siona. Nov. 4, 1999. Times).

"Tune into Yahoo! Radio; Yahoo! teams up with Broadcast.com and Spinner.com to Provide 10 stations of Audio Programming" (May 11, 1999. Business Wire).

Yahoo Offers one-stop shop for e-music (Aug. 25, 1999. Milwaukee Journal Sentinel).

Yahoo! Press Release.

"WebRadio.com Signs on as Liquid Music Network Affiliate Offering Liquid Audio Digital Downloads" (Sep. 1, 1999. Business Wire).

"Blue Note Radio: Now Playing on a Computer Screen Near You. EMI's Blue Note Records Expands New Media Intitiative with RadioWave.com" (Apr. 4, 2000. PR Newswire).

"Set-top box that reads your mind" Taylors, Paul. Dec. 30, 1998. Financial Times, London.

Rajapakshe, H. et al., "Video On Demand," Jun. 1995, pp. 1-15.

Welz, G., "Integrated Streaming Technologies," Oct. 30, 1996, pp. 1-3.

* cited by examiner

METHOD AND SYSTEM FOR DISPLAYING CONTENT WHILE REDUCING BURN-IN OF A DISPLAY

FIELD OF THE INVENTION

This invention is related to a method and system for displaying content while prolonging the life of a display by reducing phosphor burning on the display.

BACKGROUND OF THE INVENTION

Displays such as cathode ray tubes (CRTs) are well known for displaying motion pictures and other content such as graphical or textual content. A typical CRT has a screen that is coated on an inner surface with phosphorescent material arranged in a given pattern. The phosphorescent material glows when bombarded by electron beams emanating from electron guns to form a pattern corresponding to an image. In time, the glowing causes the phosphorescent material to wear, thus affecting its ability to display an image on the screen. It is desirable to have the phosphorescent material wear evenly across the entire screen so that over time the contrast and image display capabilities are uniform across the entire screen. Similar wear can occur with projection and plasma displays as well. It is equally desirable for these devices to exhibit even wear of the materials that facilitate their luminance.

In displays, for example, images move frequently as in a motion picture, thus allowing various parts of the phosphorescent material on the screen to glow at different times. This has an averaging effect on the wear characteristics such that no localized area of the phosphorescent material on the screen wears more or less than an adjacent localized area. However, in other instances, displayed images may contain various stationary content such as pictures, text, graphics or other stationary content. Additionally, as in the case of text, a sharp contrast may exist between the glowing areas of the text and the adjoining areas of the screen. The stationary aspect of the image, and especially the sharp contrast combined with the stationary aspect, causes uneven phosphorescent material wear characteristics between adjacent localized areas on the screen. Damage can result to the phosphorescent screen in these areas such that images are burned into the screen leaving an undesirable permanent scar in the phosphorescent coating. As a consequence, when further images are displayed in the scarred area, the outline of the image may be blurred or the outline of the scar may remain partially or totally visible. This effect is well known in the industry as screen burn-in.

In order to address this burn-in problem, various methods have been developed. For example, in computer applications where a CRT is used as a monitor, the computer generates various screen savers which turn off the still text and replace it with moving images until the user desires to view the textual information again at which time the screen saver is removed.

U.S. Pat. No. 4,677,430 teaches a method for operating a display monitor to prevent burn-in of the screen. This patent discloses a method of imperceptibly moving displayed images by changing the temporal relationship between the information signal transmitted to the monitor and signals used to synchronize the scanning of the screen. The synchronizing signal is delayed with respect to the information signal and the delay is sequentially increased from a minimum delay to a maximum delay and then sequentially decreased back to the minimum delay over a relatively long period of time. The effect of this method is that the entire screen is shifted by a vertical displacement and/or a horizontal displacement.

U.S. Patent Application Publication Number US2001/0035874 discloses a method for reducing burn-in of a CRT that is used in closed circuit television (CCTV) applications. In these applications, text is typically overlaid on a video image, usually at the bottom of the screen. This patent application teaches a method of moving the overlaid text in a window by an amount in either the x or y-axes. This US2001/0035874 allows for textual information to be moved on the screen by inserting a blank space or moving a blank space in each character line by utilizing the character generator chip to provide blanked out portions. The method periodically changes the location of the textual information overlaid onto the video image by altering the information itself so that the information is continuously available, but does not remain in the same place for prolonged period of time thus avoiding burn-in of the textual information.

In certain applications, for example, in the transmission of music over cable television or satellite television networks, various content is typically displayed in conjunction with a broadcast music channel. In other applications, such as local display of advertising content on an in store display, or various other local broadcasts some content may remain stationary, resulting in screen burn-in. This content may include various components, such as, but not limited to, an image of the album cover, artist information, music trivia, channel title, various logos, advertising material, and various other content. Some of the content may remain relatively stationary on the screen with risk of causing burn-in. The methods developed thus far are each problematic or unusable in this application. For example, screen savers are not usable since they typically make the content temporarily unavailable or unreadable. The method utilized in U.S. Pat. No. 4,677,430 discussed above is not feasible for this application because it is undesirable and impractical to modify the synchronizing signal in order to cause shifting of the screen. The method of U.S. Patent Application Publication Number US2001/0035874 allows for textual information to be moved on the screen by inserting a blank space or moving a blank space in each character line by utilizing the character generator chip to provide blanked out portions. This method is not feasible for non-textual content that is displayed as an image in an area of the screen.

What is needed is a system and method for reducing screen burn-in of a user's display which is useful in applications where various content including but not limited to images, text, or graphics is displayed.

SUMMARY OF THE INVENTION

The invention provides a method and system for reducing uneven burn-in of a display during usage. A plurality of assets that may include text, graphics, and video are stored and then gathered. These assets are then assembled based on a template to form a video frame or "screen", which is subsequently output to a display. Based upon a trigger, the assets are gathered again and reassembled in a second template to form a second video frame or "screen" wherein the assets are in positions on the screen, which are different from those of the first screen. The second screen is subsequently output to the display.

BRIEF DESCRIPTION OF THE DRAWINGS

The invention will now be described by way of example with reference to the accompanying figures of which.

DETAILED DESCRIPTION OF THE INVENTION

The method for displaying content while reducing burn-in on a display will now be described with reference to FIGS. 1–3.

Figure 1:
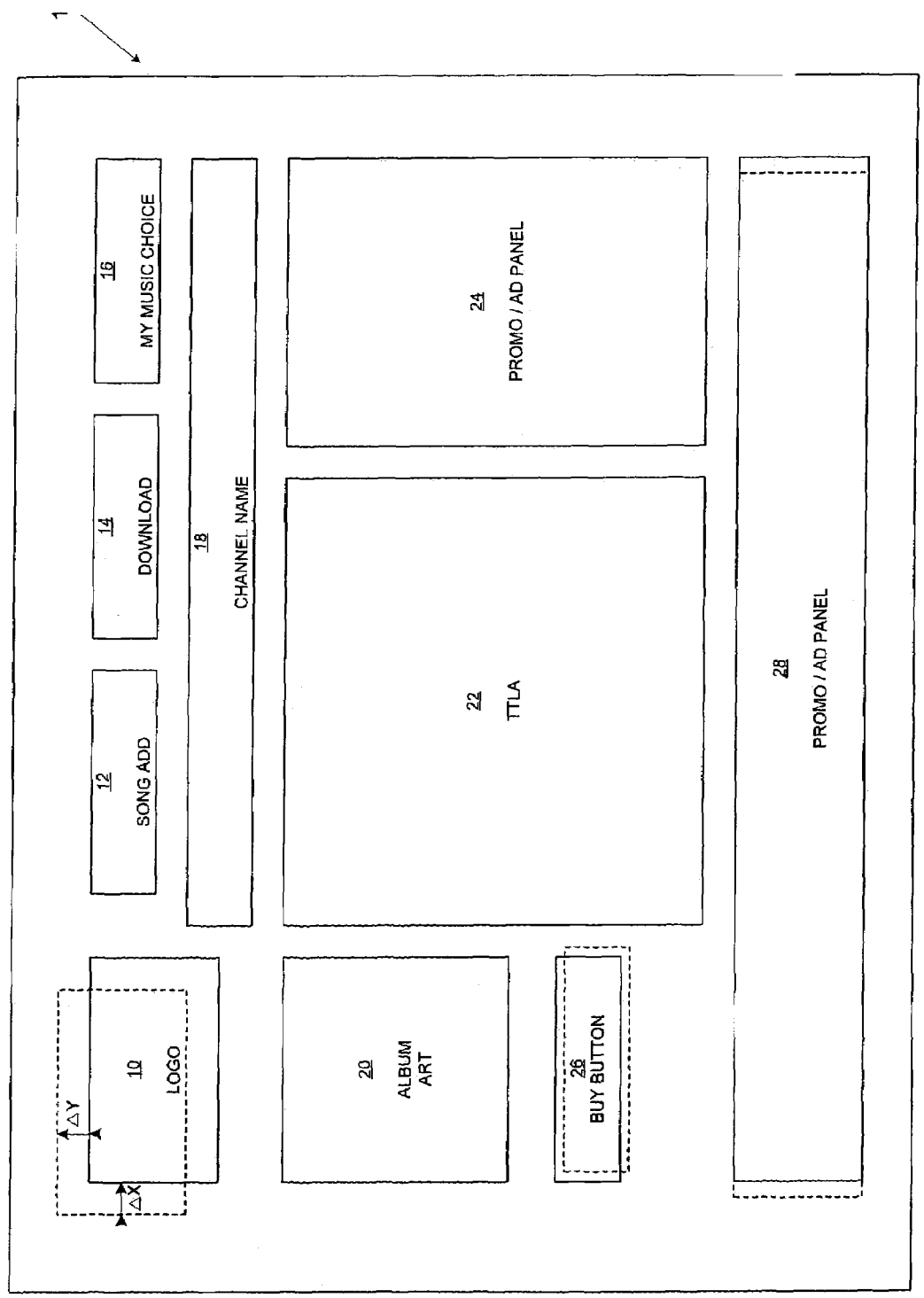
FIG. 1 is a diagrammatic view of a screen for display according to the present invention.
Figure 2:
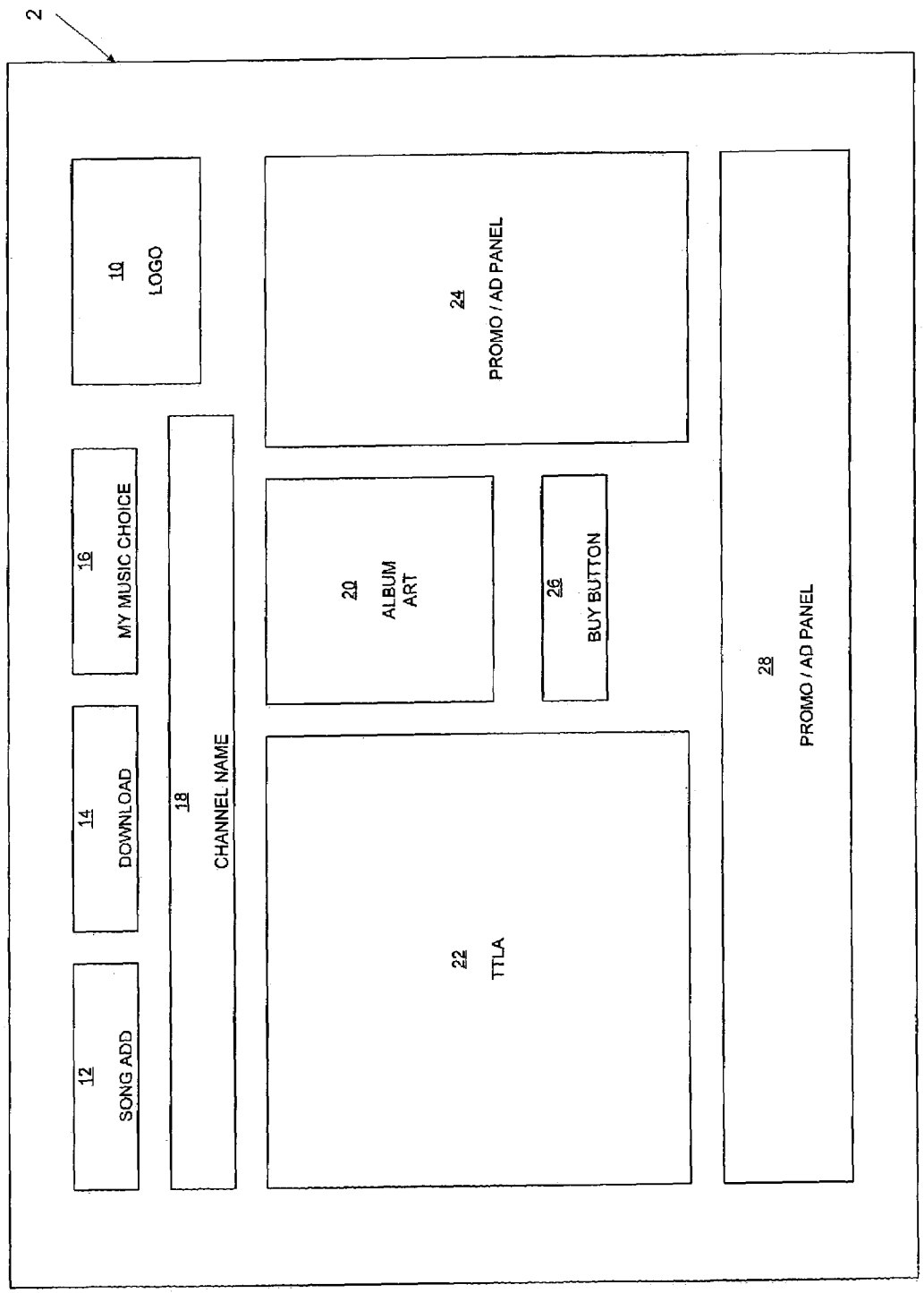
FIG. 2 is a second diagrammatic view of a screen for display according to the present invention.

Referring first to FIG. 1, an exemplary screen 1 is shown containing various information and other content. Each of the items of content will hereinafter be referred to as assets. These assets may include but are not limited to textual information, motion picture video, graphics, control features such as buttons or pull down menus, promotional materials, or other control mechanisms. Referring first to FIG. 1, a plurality of assets is displayed on the screen 1. Those reasonably skilled in the art will appreciate that while certain assets will be described in these embodiments, other types of assets may be substituted. FIG. 1 shows a screen 1 which is displayed coincident with the transmission of a broadcast music channel. The screen 1 contains various assets including a logo 10, a song add button 12, a download button 14, a personalized channel choice button 16, a channel name 18, album art 20, title track label and artist information 22, promotional/advertising panels 24, 28 and a buy button 26. The logo and the album art assets 10, 20 contain graphical content while the channel name and title track label and artist assets 18, 22 contain primarily textual content but may also contain graphical content. The promotion/advertising panels 24, 28 may contain a combination of graphic and textual content and may alternatively contain motion picture video content. The assets described thus far namely 10, 18, 20, 22, 24, and 28 are primarily for the purpose of conveying information to the viewer either graphically, textually, or through video. The remaining assets namely the song add button 12, the download button 14, the personalized choice button 16, or the buy button 26 may each contain graphical and/or textual content for the purpose of allowing the user to make a selection or transfer control of the system to another sub-screen for various purposes. For example, these control buttons may be utilized to create a personalized music channel, to indicate music preferences of the user, to download a selected song, or to buy a selected album or track. It should be noted that each of the assets 12, 14, 16, 26 are arranged on the screen 1 in a given orientation and at a selected location, which is shown here as being bound by a border. It should be understood that in all cases the border is simply indicative of the location of the particular asset on the screen but that the border is not necessarily visible to the viewer.

In order to reduce screen burn-in, each of the assets may be shuffled around the screen 1 to create alternate orientations. For example, in FIG. 2, screen 2 is shown in which some of the assets are located in different positions from those shown in screen 1. For example, each of the assets has been relocated on the screen 2 except for the promotional/advertising panel 24, 28 that remains in the same location. If, for example, the content within the promotional/advertising panel 24, 28 changes over time, the need to move this asset around the screen in order to prevent burn-in is reduced. Therefore, in situations where content of an asset is changing within its location on a particular screen, the need to move the asset around the screen is either reduced or eliminated. Such changing may be in the form of changing graphics or video content.

Figure 3:
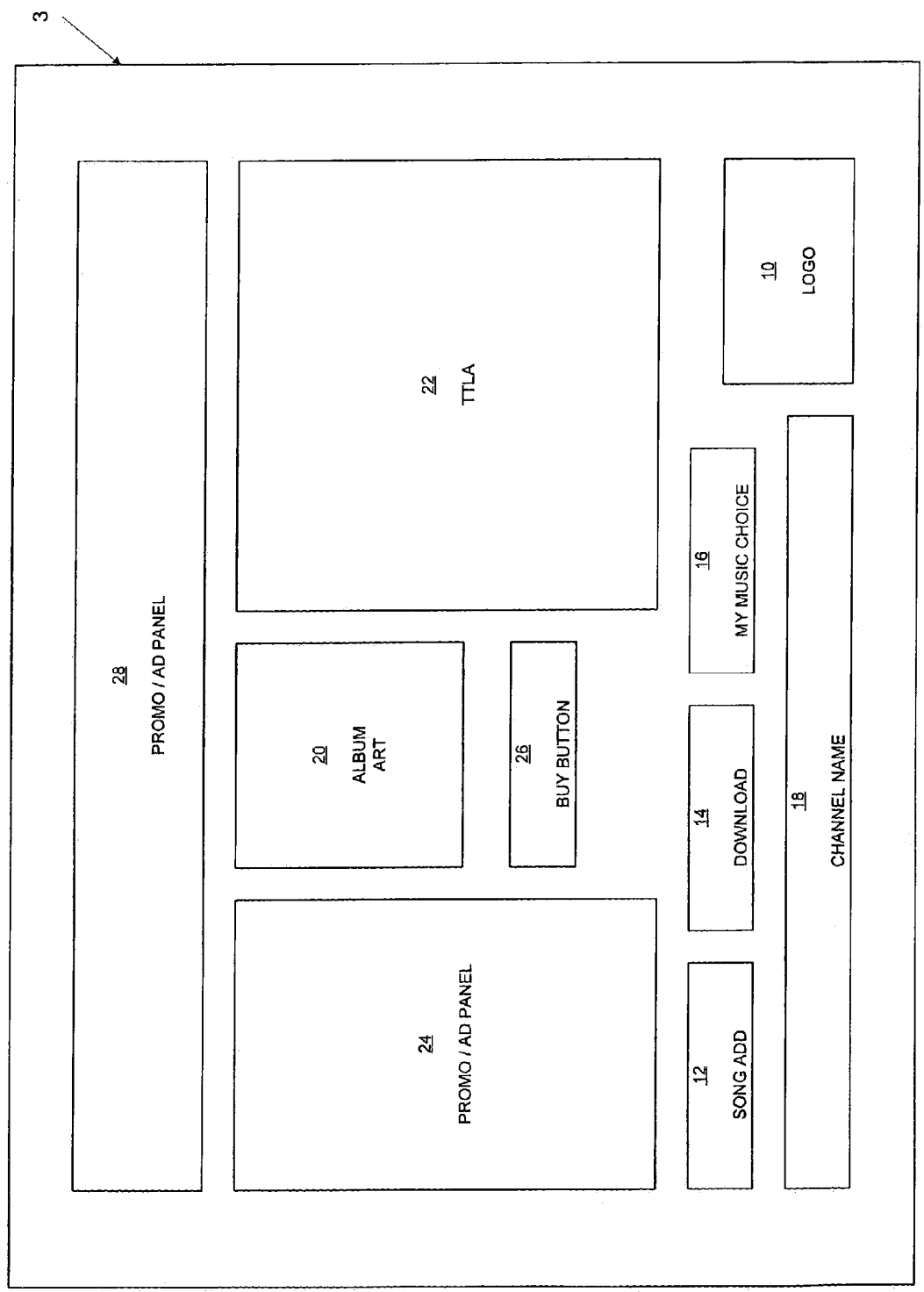
FIG. 3 is a third diagrammatic view of a screen for display according to the present invention.

FIG. 3 shows yet another screen in which all of the assets have been moved to alternate locations. The assets are moved to specified locations to prevent any stationary asset from remaining in one location on the screen for an extended period of time. The assets may be moved according to a specified movement arrangement, for example, from the arrangement of screen 1 to the arrangement of screen 2 then to the arrangement of screen 3 and subsequently to other arrangements thereafter returning to the arrangement of screen 1. The movement could alternatively be conducted according to a suitable random algorithm, which ensures that the resultant locations of each asset are such that there is no overlap of assets.

A time interval may be set for switching between screens 1, 2, and 3, or the change from screen to screen may be triggered by an event. For example, in an embodiment for transmitting a broadcast music channel, screen arrangements may change from screen 1 to screen 2 to screen 3 and other subsequent screens at the beginning of each new song being broadcast. Additionally, as mentioned above, it should be understood that assets may be selectively moved relative to each other or certain assets may remain fixed on the screen while others move. Those fixed assets are preferably ones in which the graphics, text, or video image within the asset changes at some interval. Those assets which are primarily textual or graphical and remain the same, for example the logo 10, should be moved to alternate locations from screen to screen in order to reduce screen burn-in in any one location.

An alternate embodiment of the method according to the present invention will be described with reference to FIG. 1. Instead of shuffling the assets as described above from screen 1 to screen 2 to screen 3 and so on, each asset may be incrementally moved along one or two axes on the screen as shown by the phantom lines in FIG. 1. For example, the logo 10 may be moved a given number of pixels along the y-axis a distance $\Delta y$ and may also be moved a number of pixels along the x-axis a distance $\Delta x$. It should be understood that while the logo 10 is shown as being moved in two axes it may alternatively be moved in a single axis x or y. The movement in a single axis is best shown in the promotion/advertising panel 24, 28 which has been shifted along the x axis a small amount to the left in FIG. 1. The buy button 26 is also shown by way of example as being shifted a very small amount namely a few pixels in each of the x and y axes. It should be understood that while only three assets 10, 26, 24, 28 are shown here as being shifted or moved, each and every asset on the screen is capable of being similarly shifted either in a single axis or along both axes. Each asset may be shifted independent of the other and relative to each other without the need for shifting all assets together. In this way, assets can be shifted relative to each other incrementally along a predetermined pattern or randomly in such a way that their movement does not cause them to overlap. Additionally, the period between asset movements may be predetermined or random and the period may affect one or a plurality of assets at a given time.

An exemplary embodiment of a system for reducing burn-in of a display will now be described with reference to FIG. 4. An audio broadcast system 40 is designed for transmitting various-music channel broadcasts over a network such as a cable television network or a satellite network for distribution to a plurality of subscribers. It should be understood, however, that while the system described here is utilized for the broadcast of audio channels, the system is adaptable for use in broadcasting other content as well.

In this exemplary embodiment, a data carousel subsystem 46 retrieves data from one or a plurality of data sources 42, 44. The first data source 42 may contain, for example, information to support the channel name asset 18 and may include a song identification database, which contains playlist information, which is programmed by genre or channel for a given type of music. The first data source 42 may be managed by and associated with a server, which allows the database to be updated and managed, and also facilitates communication with the data carousel subsystem 46.

The second data source 44 may include, for example, information to support the album art asset 20, the title and track label and artist asset 22, and information to support other assets. The second data source 44 may also be associated with and connected to a server or other computer for managing the database and/or facilitating communications with the data carousel subsystem 46. It should be understood that while two data sources are shown here, a single data source or a plurality of data sources may be connected to or in communication with the data carousel subsystem 46. The data sources 42, 44 may or may not be located in a single location and may or may not be co-located with the data carousel subsystem 46.

The data carousel subsystem 46 may be implemented utilizing a personal computer or a general-purpose computer having associated storage capabilities. The data carousel subsystem 46 receives data from data sources 42, 44 and may also receive data, which is downloadable from other data sources or entered directly into the data carousel subsystem 46 through user intervention. The data carousel subsystem 46 contains template information including a plurality of templates for the asset arrangements of screens 1, 2, and 3. As an alternative, the template information may be housed in one of the data sources 42, 44. The data carousel subsystem 46 is capable of managing/creating the templates, which may be coded utilizing HTML, XML or other suitable protocols for creating templates/screens having text and other assets such as those described above. Additionally, the data carousel subsystem 46 may store and execute suitable algorithms for moving selected assets such as the logo 10, the buy button 26, and the promotional/advertising panel 24, 28 as was shown and described above in the alternate methods with reference to FIGS. 1–3.

The broadcast playout system 50 is the mechanism by which fundamental programming content is played from recorded media. It is often based on commercially available broadcast automation hardware and software. The broadcast playout system 50 sends audio content, such as queued songs, to the audio encoder 49 and at a pre-determined time, sends a trigger to the data carousel subsystem 46 to initiate an associated data feed. The data carousel subsystem 46 generates a trigger to an MPEG encoder 47. In response to the trigger, the MPEG encoder 47 pulls template information, images, and text from the data carousel subsystem 46 and creates an MPEG video frame, having embedded assets such as screens 1, 2 or 3 which are associated with the currently queued song. This is accomplished by populating a given template or screen with current information/content from data sources 42, 44. It should be understood that this process may be executed for a plurality of channels simultaneously. The MPEG encoder 47 then creates an MPEG transport stream for all channels with the embedded MPEG video frames. The MPEG encoder 47 may be implemented utilizing a commercially available encoder or a general-purpose computer. Based upon a trigger from the broadcast playout system 50, a multiplexer 48 receives the MPEG transport stream from the MPEG encoder 47 and simultaneously receives an encoded audio feed from an audio encoder 49. The multiplexer 48 serves to combine the audio feed from the audio encoder 49 and the associated encoded MPEG transport stream from the MPEG encoder 47. The multiplexer 48 then feeds the multiplexed signal out for broadcast in the form of a video transport stream to the head end of a service provider, such as a cable television network or a satellite network provider as is well known in the art.

A second exemplary embodiment of an alternate system for reducing screen burn-in of a display will now be described with reference to FIG. 5. System 140 is designed for storing or locally transmitting various video and/or audio content according to the method described in reference to FIGS. 1–3 above.

Figure 4:
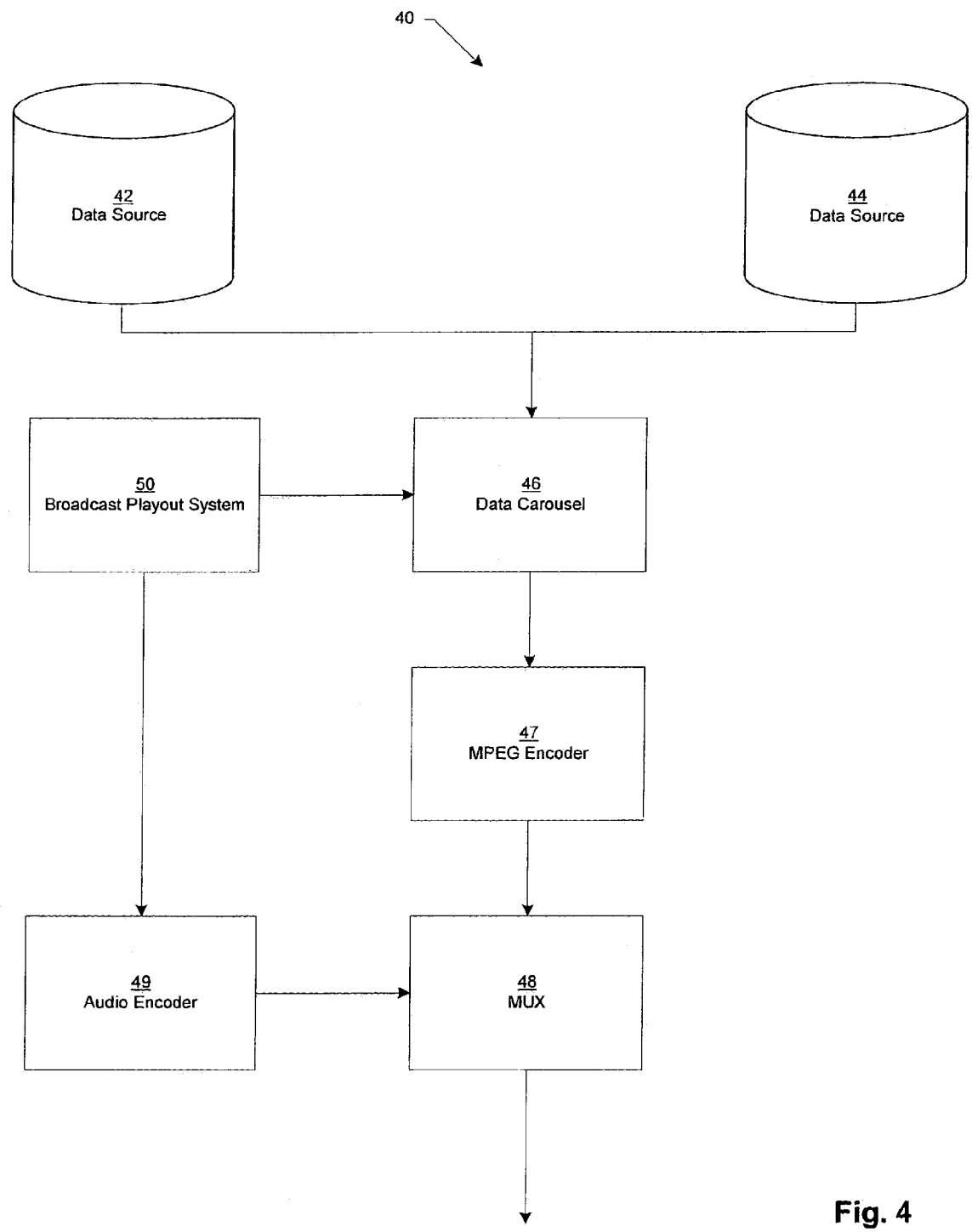
FIG. 4 is a block diagram of an exemplary system for generating screens for broadcast according the present invention.

In this second exemplary embodiment, a data carousel subsystem 146 retrieves data from one or a plurality of data sources 42, 44 as described in the embodiment of FIG. 4 above. It should be understood that the data sources 42, 44 may contain various assets not limited to those shown in the examples of FIGS. 1–3. The data carousel subsystem 146 may be implemented as part of a personal computer or general purpose computer having associated storage capabilities. Alternatively, the data carousel subsystem 146 may be implemented as a separate personal computer or general purpose computer having associated storage capabilities. The data carousel subsystem 146 contains similar template information as the data carousel subsystem 46 for creating various asset arrangements. It should be understood that the template information may be modified according to desired asset placement and replacement on the resultant screens. The data carousel subsystem 146 also has template management capabilities similar to the data carousel subsystem 46. Additionally, the data carousel subsystem 146 may store and execute suitable algorithms for moving selected assets as was shown and described above in the alternate methods with reference to FIGS. 1–3.

The image encoder 147 receives output from the data carousel subsystem 146 to create a video frame. The image encoder 147 may be implemented within a personal computer or general purpose computer or may alternatively be implemented as a separate piece of encoding equipment which is commercially available for generating encoded video frames.

An audio feed or audio encoder 149 supplies audio which is associated with the video frame output of the image encoder 147. It should be understood that the audio encoder 149 is an optional element in this system and may be removed in applications where only video without audio is desired. The audio encoder 149 may be implemented utilizing commercially available equipment or may be implemented as part of a personal or general purpose computer.

A multiplexer 148 serves to combine the audio feed/encoder output 149 with the image encoder output 147 to create a transport stream at its output. It should be understood that the audio encoder 149 and the image encoder 147 may be triggered or otherwise timed to send output to the multiplexer 148 simultaneously in order to match desired audio with desired image content. It should also be understood that the multiplexer 148 may be removed from the system 140 when the optional audio encoder 149 is not used. In this case, the image encoder 147 output could be fed directly into the storage/playout device 150 which will be described below.

The output of the multiplexer 148 is fed to a storage/playout device 150. The storage/playout device 150 may be implemented utilizing any display or transmission device which is capable of displaying or transmitting video images. Alternatively, in applications where playout is desired at a later time, the storage/playout device 150 may be implemented utilizing a recorder for creating or writing to any suitable storage medium such as DVD, CD ROM, hard disk, or any other suitable read only or rewritable storage medium. The storage/playout device 150 may be alternatively implemented utilizing portable memory devices according to PCMCIA or other suitable memory standards. The storage/playout device 150 could also be a direct playout device such as a display. The system 140 advantageously allows for utilizing the methods of the present invention for creating various stored content which when played back will reduce screen burn-in.

Figure 5:
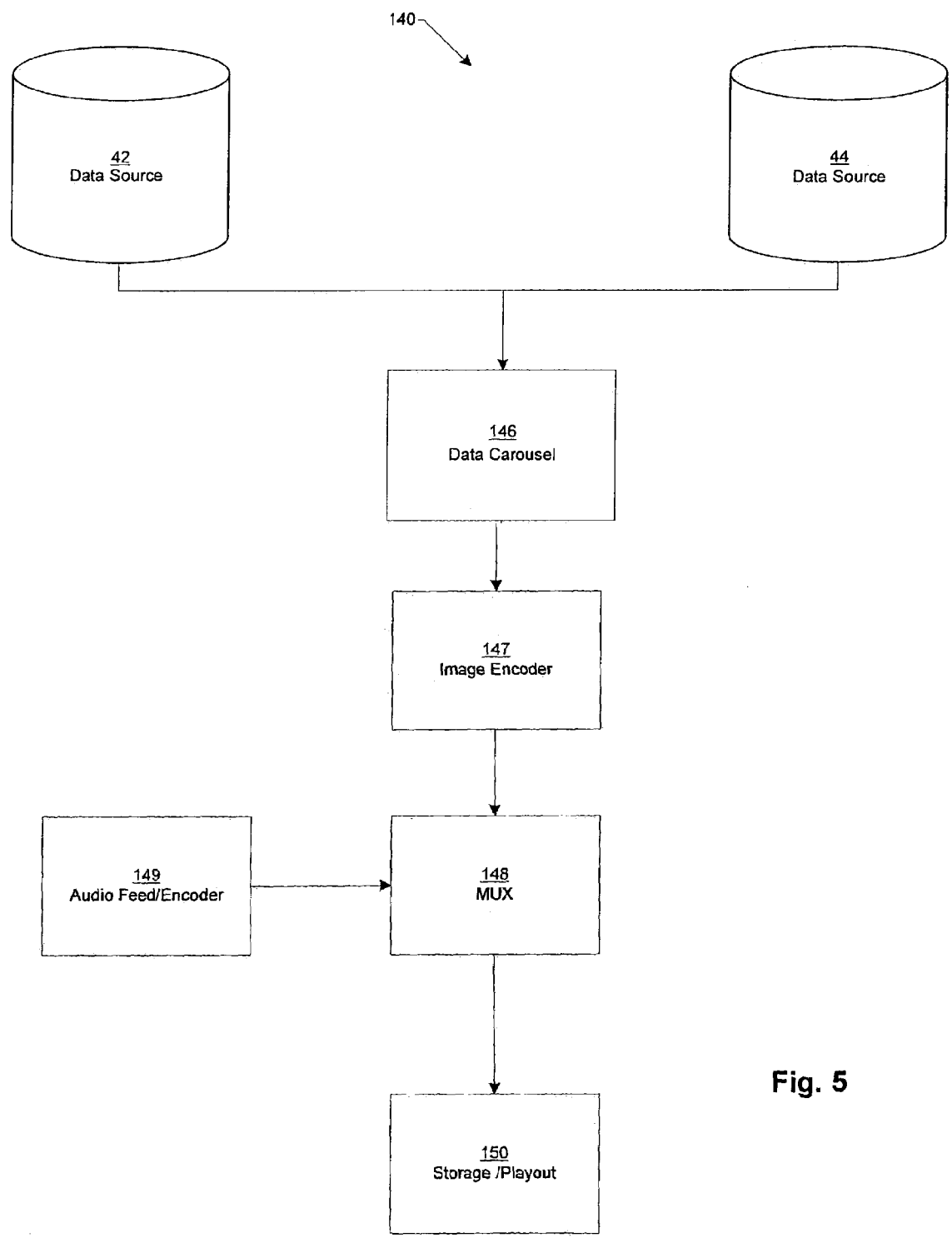
FIG. 5 is a block diagram of a second exemplary system for generating screens according to the present invention.

The elements of FIG. 5 may be incorporated within a personal or general purpose computer to reduce screen burn-in of a computer monitor by moving relatively still content on the computer display or monitor according to the methods of the present invention.

While this system 140 has been described in the context of generating a single frame or screen for display, it should be understood that this system 140 is utilized in executing the methods described above wherein the process is repeated such that assets are moved on the display according to the stored templates to reduce screen burn-in. It should also be understood that the system 140 is capable of simultaneously transmitting, playing out, or storing such content for later play back utilizing the methods disclosed above.

The system 40 advantageously reduces screen burn in by moving assets on the screen according to stored template information without modifying a transmitted TV signal or video transport stream. Assets are shifted on screen prior to output of the transport stream therefore eliminate the need to modify any signal at the display as required by the prior art.

The foregoing illustrates some of the possibilities for practicing the invention. Many other embodiments are possible within the scope and spirit of the invention. For example, it should be understood that this method and system may be applicable to broadcast systems as well as systems that display information from sources local to the display, including but not limited to video disc players, computers, etcetera. It is, therefore, intended that the foregoing description be regarded as illustrative rather than limiting, and that the scope of the invention is given by the appended claims together with their full range of equivalents.

What is claimed is:

1. A method for reducing burn-in of a display during a broadcast comprising:
    storing a plurality of distinct visual assets, wherein the plurality of distinct visual assets includes a first visual asset comprising a first complete image and a second visual asset comprising a second complete image;
    in response to a trigger, automatically retrieving the first and second assets and generating a first screen comprising the first and second complete images, wherein the first complete image is positioned at a first screen position and the second complete image is positioned at a second screen position that is different than the first screen position;
    after generating the first screen, broadcasting the first screen to a plurality of broadcast receivers;
    generating a screen update trigger after broadcasting the first screen;
    in response to the screen update trigger, generating a second screen comprising the first and second images, wherein the screen position of the first image for the second screen is different than the screen position of the first image for the first screen; and
    after generating the second screen, broadcasting the second screen to the plurality of broadcast receivers.

2. The method of claim 1, further comprising storing a plurality of screen templates, wherein the screen position of the first asset in the first screen and the screen position of the second asset in the first screen are determined by one of said plurality of templates.

3. The method of claim 2, wherein the first screen is multiplexed with an audio signal corresponding to a first portion of an audio recording to generate a multiplexed signal.

4. The method of claim 3, wherein the multiplexed signal is broadcast over a broadband network to the plurality of broadcast receivers.

5. The method of claim 3, wherein the first complete image is an image of an album cover associated with the audio recording and the second complete image is a logo.

6. The method of claim 1, wherein each broadcast receiver is operable to transmit the first screen to a display device coupled to the broadcast receiver.

7. The method of claim 1, further comprising:
    storing a plurality of audio recordings in a storage unit, wherein the first visual asset corresponds to at least one of the plurality of audio recordings;
    retrieving the at least one audio recording;
    broadcasting to the plurality of broadcast receivers an audio signal corresponding to a portion of the audio recording concurrently with the first screen so that the plurality of broadcast receivers receive the broadcast audio signal and the first screen concurrently.

8. The method of claim 1, further comprising queuing the first screen for broadcast to the plurality of broadcast receivers immediately after generating the first screen.

9. The method of claim 1, wherein the screen position of the first image for the first screen is different than the screen position of the first image for the second screen by no more than a few pixels in any direction.

10. A method of preventing screen burn-in comprising:
    storing a plurality of image files in data store, each image file containing a complete image;
    storing a plurality of audio recordings
    storing in a database data that associates each of said plurality of audio recordings with at least one of said image files;
    storing a playlist that includes a list of audio recording identifiers, each of which identifies one of the plurality of audio recordings;
    using the playlist to select an audio recording from said plurality of audio recordings;
    retrieving the selected audio recording;
    retrieving from the data store a first image file and a second image file, wherein the first image file stores a first complete image and the second image file stores a second complete image, and wherein the first image file is associated with the selected audio recording;

after retrieving the first and second image files, generating a first screen comprising the first complete image stored in the first image file and the second complete image stored in the second image file, wherein said first image is positioned at a first screen position and said second image is positioned at a second screen position;

concurrently transmitting to a broadcast receiving device, via a network, a first portion of the audio recording and the generated first screen;

generating a second screen while a portion of the audio recording is being transmitted to the broadcast receiving device, wherein the second screen comprises the first complete image and the second complete image, wherein, for the second screen, the first image has a position that is different than the position it had for the first screen; and concurrently transmitting the generated second screen and a second portion the audio recording to the broadcast receiving device.

11. The method of claim 10, wherein the step of generating the first screen comprises using a template to determine the first screen position for the image from the first image file.

12. The method of claim 10, wherein the step of concurrently transmitting to the receiving device, via a network, the first portion of the audio recording and the generated first screen comprises multiplexing an audio signal corresponding to the first portion of the audio recording with the first screen to generate a multiplexed signal.

13. The method of claim 12, wherein the multiplexed signal is broadcast over a broadband network.

14. The method of claim 10, wherein the difference between the position of the first image in the first screen and the position of said image in the second screen is not more than a few pixels in any direction.

15. A system for reducing screen burn-in caused by transmission of screens to a display, the system comprising:

at least one data source for housing screen assets and a plurality of templates, wherein each template associates each of a plurality of asset types with a unique screen position;

a data carousel subsystem for retrieving screen assets and assembling a screen by positioning the retrieved screen assets in accordance with a template selected from the plurality of templates; and a transmitter for transmitting to a receiving device, via a network, the assembled screen concurrently with an audio signal corresponding to a selected audio recording.

16. The system of claim 15, further comprising a multiplexer for multiplexing the assembled screen with the audio signal.

17. The system of claim 16, further comprising a broadcast playout system configured to select audio recordings and configured to transmit a trigger to the data carousel upon selecting an audio recording.

18. The system of claim 17, wherein the data carousel system is configured to assemble a screen in response to receiving a trigger from the broadcast playout system.

19. The system of claim 15, wherein a first template associates a first asset type with a first screen position and a second template associates the first asset type with a second screen position, wherein the distance between the first position and the second position is not more than a few pixels.

20. The system of claim 15, wherein the data carousel subsystem is part of a computer.

21. The system of claim 15, wherein the data carousel subsystem comprises a computer.

22. In an environment comprising an audio transmission system and a receiving device for receiving audio signals and images transmitted from the transmissions system, a method for displaying the images on a display device coupled to the receiving device, comprising:

(a) receiving at the receiving device an audio signal transmitted from the transmission system, wherein the audio signal corresponds to a specific audio recording, and outputting the audio signal so that a user of the device may listen to the audio recording;

(b) while performing step (a):

(1) receiving at the receiving device a first complete image and a second complete image transmitted from the transmission system, wherein the images are received at the same time;

(2) in response to receiving the images, concurrently displaying the images on the display screen, wherein the first image covers only a first portion of the display screen and the second image covers only a second portion of the display screen, wherein the first portion of the display screen differs from the second portion;

(3) after performing steps (1) and (2), receiving at the receiving device data transmitted from the transmission system;

(4) in response to receiving the data, displaying the first image on the display screen so that the first image covers only a third portion of the display screen and displaying the second image on the display screen so that the second image covers only a fourth portion of the display screen, wherein the third portion of the display screen is different than the first portion, the fourth portion of the display screen is different than the second portion, and the third portion does not overlap at all with the fourth portion.

23. The method of claim 22, wherein the first image is an image of a CD cover corresponding to a CD on which the audio recording is recorded.

24. The method of claim 22, wherein the second image is an image of a logo.

25. The method of claim 22, wherein the center of the first portion of the display screen is not more than a few pixels apart from the center of the third portion of the display screen.

26. The method of claim 22, wherein the data transmitted from the transmission system comprises the first and second images.

* * * * *